United States Patent
Ma

(10) Patent No.: US 7,076,360 B1
(45) Date of Patent: Jul. 11, 2006

(54) AUTO-IGNITION TIMING CONTROL AND CALIBRATION METHOD

(76) Inventor: Thomas Tsoi Hei Ma, 30 Creekview Road, South Woodham Ferrers, Essex CM3 5YL (GB)

( * ) Notice: Subject to any disclaimer, the term of this patent is extended or adjusted under 35 U.S.C. 154(b) by 0 days.

(21) Appl. No.: 11/080,302

(22) Filed: Mar. 15, 2005

(51) Int. Cl.
   *F02D 41/34* (2006.01)
   *G06F 19/00* (2006.01)

(52) U.S. Cl. .................................... 701/103
(58) Field of Classification Search ........... 701/103, 701/102, 115; 123/480, 48 A, 179.21, 295
   See application file for complete search history.

(56) References Cited

U.S. PATENT DOCUMENTS

| | | | |
|---|---|---|---|
| 5,570,667 A * | 11/1996 | Gray et al. ............ | 123/179.21 |
| 6,427,643 B1 * | 8/2002 | Dixon ...................... | 123/48 A |
| 7,013,212 B1 * | 3/2006 | de Ojeda et al. .......... | 701/103 |
| 2003/0097998 A1 | 5/2003 | Gray | |

* cited by examiner

*Primary Examiner*—Hieu T. Vo
(74) *Attorney, Agent, or Firm*—Shalom Wertsberger; Saltamar Innovations

(57) ABSTRACT

An auto-ignition timing control and calibration method for use in an internal combustion engine having more than one ignition modes including the mode of compression ignition of a premixed fuel/air mixture (CAI/HCCI), wherein when the engine is operating in the CAI/HCCI mode, in order to determine a prescribed setting or combination of settings of engine operating parameters necessary to achieve a target auto-ignition timing according to a predetermined auto-ignition timing map, the associated compression temperature trajectory of the cylinder charge with time, calculated in dependence on the initial and boundary conditions of the said charge subjected to the said prescribed setting or combination of settings of the said engine operating parameters, and further in dependence on the interim heat exchange processes affecting the said charge, is used for testing and verifying that the said trajectory reaches a target temperature at a target reference timing relative to TDC of the engine, and wherein the said target temperature and timing are predetermined by calibration.

33 Claims, 3 Drawing Sheets

AUTO-IGNITION TIMING CONTROL AND CALIBRATION METHOD

FIELD OF THE INVENTION

The present invention relates to a method for controlling the operating conditions for auto-ignition in an internal combustion engine so that the auto-ignition timing may be set accurately.

BACKGROUND OF THE INVENTION

A unique combustion process, referred to by various generic names such as premixed charge compression ignition (PCCI), homogeneous charge compression ignition (HCCI), or controlled auto-ignition (CAI), has been the subject of intensive research because of potential advantages of high efficiency, near-zero NOx emission and extremely low smoke pollution. It is also a common-mode combustion process which could be used advantageously in both types of the conventional internal combustion engine, namely, the gasoline spark ignition (SI) engine and the diesel compression ignition (CI) engine. However, there are several technical problems related to the use of the above combustion process in automotive applications. Firstly, it is difficult to control, for lack of direct triggering means, precisely the start of CAI/HCCI combustion which tends to happen on its own depending on the past temperature history of the premixed fuel/air mixture. Secondly, the relatively small part load operating range of CAI/HCCI combustion makes it necessary for the engine to be switchable instantaneously between the conventional SI or CI combustion mode and the CAI/HCCI combustion mode in order to achieve full range engine operation. It is difficult to achieve seamless switching to CAI/HCCI mode, which may take place under a wide variety of engine operating conditions prevailing at the time of switching, without knowing the actual auto-ignition timing and what corrective action might be necessary to move it to an optimum timing.

It is known that auto-ignition combustion and the precise timing of the auto-ignition are influenced indirectly but strongly by a large number of internal and external parameters, including engine compression ratio, engine speed and load, fuel composition, fuel/air mixture ratio, fuel injection and evaporation, intake charge quantity and temperature, coolant temperature, EGR quantity and temperature, residual charge quantity and temperature etc. Change in any one of these parameters could induce auto-ignition and alter the auto-ignition timing, while changes in several of these parameter could interact with one another, alter the auto-ignition tendency and influence the auto-ignition timing in many ways. It is necessary to understand the effect of each of the parameters and describe them quantitatively in a measurable and calibratable manner so that a control system may be designed to take into account all the changes and command the precise corrective action explicitly in response to an auto-ignition timing demand. This is however an extremely difficult task because of the myriad of the above indirect but strongly influencing parameters leading to an exponential explosion of the calibration effort as well as unmanageable increase in the complexity of the control system.

For example, the effective compression ratio of the engine may be chosen as the prescribed engine operating parameter (in preference to some other equally effective parameters) for inducing auto-ignition and influencing the auto-ignition timing as proposed in U.S. Pat. No. 6,427,643. In this case, although the directional requirements for the change in compression ratio are known, such as higher compression ratio for lower loads, lower compression ratio for higher intake air temperature etc, it is not possible to define a precise command setting of the compression ratio explicitly that would directly trigger a predictable and precise auto-ignition timing under any operating condition according to a predetermined auto-ignition timing map while the rest of the above mentioned parameters are all having influence and must be accounted for in a measurable and calibratable manner. Unlike a spark ignition engine where a precise command of the spark timing will directly trigger a predictable and precise timing of ignition, or a diesel engine where a precise command of the fuel injection timing will directly trigger a predictable and precise timing of flame initiation, both involving substantial calibration effort and control complexity, there is no equivalent direct trigger in the auto-ignition engine. Changing the compression ratio according to a compression ratio map is not sufficient to guarantee that the auto-ignition timing will match a higher level map of target auto-ignition timing with sufficient accuracy that is expected in a modern controlled and optimised engine. As mentioned earlier, the technical barrier remains because of the myriad of indirect but strongly influencing parameters in addition to compression ratio leading to exponential calibration effort and unmanageable control complexity.

US2003/0097998 proposed a method that attempts to directly trigger the auto-ignition timing by introducing a sudden increase in compression ratio near the end of the normal compression stroke of the engine. In this case the auto-ignition is confined within a narrower timing window close to TDC of the engine, but the precise auto-ignition timing would still depend on the magnitude of the sudden compression ratio increase. Of course, a very large sudden compression ratio increase will immediately trigger auto-ignition by brute force but at the expense of very high combustion pressures that would immediately follow leading to excessive stress, noise and high NOx emissions. Providing a measured sudden compression ratio increase would be the desired solution, but this would still require huge calibration effort and control complexity in taking into account all the above mentioned indirect but strongly influencing parameters in order to be able to define a precise command setting of the sudden compression ratio increase that would produce a predictable and precise auto-ignition timing under any engine operating condition according to a predetermined auto-ignition timing map.

Ignition timing is commonly defined as the time when the instruments detect 5% of the charge has ignited and burnt. Ignition delay is commonly defined as the delay time from the time of activation of the charge for initiating combustion to the above detected ignition timing. The rate of combustion will increase rapidly starting from the ignition timing, and later slow down towards the end of combustion which is commonly defined as the time when the instruments detect 95% of the charge has been burnt.

The term calibration as used herein relates to obtaining by prior measurements, theoretical calculations, or a combination thereof, a set of values of a plurality of auto-ignition timing points for a variety of engine settings and operating conditions. Such mapping of timing points, and storage of the optimum values into a finalised calibration map (or look-up table) will define the target auto-ignition timing and the associated delay duration for the engine, when the engine (or a similar engine) is subsequently controlled according to the present invention to operate at the same optimum condition.

OBJECT OF THE INVENTION

The present invention aims to reduce the calibration complexity by introducing a unified approach for managing the large number of calibrating parameters that influence the auto-ignition timing.

SUMMARY OF THE INVENTION

According to the preferred embodiment of the present invention, there is provided an auto-ignition timing control and calibration method for use in an internal combustion engine having more than one ignition modes including the mode of compression ignition of a premixed fuel/air mixture (CAI/HCCI), wherein when the engine is operating in the CAI/HCCI mode, in order to determine a prescribed setting or combination of settings of engine operating parameters necessary to achieve a target auto-ignition timing according to a predetermined auto-ignition timing map, the associated compression temperature trajectory of the cylinder charge with time, calculated in dependence on the initial and boundary conditions of the said charge subjected to the said prescribed setting or combination of settings of the said engine operating parameters, and further in dependence on the interim heat exchange processes affecting the said charge, is used for testing and verifying that the said trajectory reaches a target temperature at a target reference timing relative to TDC of the engine, and wherein the said target temperature and timing are predetermined by calibration.

Preferably, the effective compression ratio of the engine is used as one of the prescribed engine operating parameters for inducing auto-ignition and influencing the auto-ignition timing. Other parameters such as fuel/air mixture ratio, intake charge quantity and temperature, residual charge quantity and temperature may also be used as the prescribed engine operating parameter or combination of parameters, but these may have slower response and at the same time may affect engine load, which could increase the calibration and control complexity.

Preferably the said target temperature is the auto-ignition temperature of the cylinder charge defined either by theory or by experiment. In the former case, a chemical-kinetics model may be used to predict the auto-ignition temperature. In the latter case, a rapid compression machine or a reciprocating engine may be used to bring a pre-mixed fuel-air mixture to auto-ignition and measure the auto-ignition temperature.

In the preferred embodiment of the invention, a delay duration between a first timing when the cylinder charge is calculated to reach the said target temperature and a second timing when the cylinder charge shows rapid heat release by auto-ignition is predetermined by calibration of the auto-ignition engine in dependence on the composition of the cylinder charge and the speed and load operating conditions. This delay duration is then used to define the target reference timing for subsequent control of the engine (or a similar engine) by subtracting back from the target auto-ignition timing.

In calculating the compression temperature trajectory of the cylinder charge with time, the initial and boundary conditions of the cylinder charge and the interim heat exchange processes preferably include engine speed and load, engine effective compression ratio, fuel composition, fuel/air mixture ratio, fuel injection and evaporation, intake charge quantity and temperature, coolant temperature, EGR quantity and temperature, residual charge quantity and temperature, each measured or inferred using appropriate sensors. This will be based on computer modelling of the thermodynamic processes influencing the compression temperature of the charge during the compression stroke and take into account all the interactions of the initial and boundary control parameters according to thermodynamic laws, thus capturing the effects of all these parameters in a unified manner in a characteristic compression temperature trajectory. In this way, the calibration process could be simplified to a small number of in-cycle characteristic parameters which are much closer to the ignition event than the myriad of control parameters at the initial condition, and can be readily adapted for use in a high level control map explicitly for auto-ignition timing. This would bypass the traditional method of calibrating each of the engine operating parameters at the initial and boundary conditions separately in a myriad of multi-layer multi-dimensional calibration maps, and thus reduce the calibration effort to a manageable level.

The above method has one operational problem in that an arbitrarily chosen value(s) for the prescribed engine operating parameter or combination of parameters is required in order to start the calculation for the compression temperature trajectory and the resulting trajectory will have to be tested and verified that it matches with the target auto-ignition timing map, in which case the chosen value(s) for the prescribed engine operating parameter(s) will be correct.

Thus according to the preferred method of the present invention where the effective compression ratio of the engine is one of the prescribed engine operating parameters, in order to determine and set the effective compression ratio to achieve the said target auto-ignition timing according to the said predetermined auto-ignition timing calibration map (or look-up table), two or more effective compression ratio setting values are used for calculating for each setting value the associated compression temperature trajectory, and the best setting value is found iteratively by interpolation or extrapolation between the said calculated trajectories that would produce a compression temperature trajectory reaching the said target temperature at the said target reference timing associated with the said target auto-ignition timing. In this way, a precise command setting of the compression ratio could be defined that would directly trigger a predictable and precise auto-ignition timing according to the said predetermined auto-ignition timing map.

It is appreciated that the above calculations and iterations will require substantial computing power and this has to be completed in real time within a few or a single engine cycle in order to be capable of fast engine control. Such computing power is now available coming from the rapid progress in computer technology, and a powerful computer on-board a vehicle may be designed to operate according to the proposed method at a sufficient speed to support changing engine operating conditions during normal driving of the vehicle. In practice, in order to strike the right balance between accuracy and speed, a selective or condensed computational code may be used.

As a further refinement while the invention is in use, a sensor measuring the start of combustion (start of rapid heat release) may be additionally provided for validating and if necessary adjusting the calibrated value of the above defined delay duration, thereby adaptively improving gradually with time the control accuracy of the auto-ignition timing in future operations.

The present invention is applicable in any auto-ignition engine with variable compression ratio achieved by a variety of designs. Such designs may include varying the engine mechanical geometry affecting the end volume of compression, varying the intake valve closing timing affecting the start volume of compression, and introducing an auxiliary chamber connected briefly to the cylinder volume during the compression stroke of the engine. The designs in US6427643 and US2003/0097998 using an auxiliary piston are both suitable for use with the present invention, although such designs are not to be preferred because they severely compromise the shape of the combustion chamber which must operate efficiently when the engine is switched back to spark ignition or compression ignition mode.

It would be clear from the above that a small change in the target auto-ignition timing does not always imply a small unidirectional change in the compression ratio of the engine. In fact, the correlation could be non-linear and strongly influenced by the many parameters mentioned earlier in addition to the compression ratio, so that the required change in the final command setting of the compression ratio can only be determined by iterative calculations, taking into account the effects of many other engine operating parameters prevailing at the time including air charge temperature, fuel evaporation temperature, coolant temperature, residuals gas temperature, air fuel ratio, residuals quantity etc, all affecting the compression temperature trajectory. This is especially influential when the engine is being switched from the conventional SI or CI mode to the CAI/HCCI mode which may take place under a wide variety of engine operating conditions prevailing at the time of switching, for which the auto-ignition timing control method of the present invention ideally arrive at the correct optimum compression ratio setting immediately and explicitly for the first switched cycle to CAI/HCCI mode without misfire or knock.

Once the CAI/HCCI combustion has been successfully established after the first switched cycle, there are known methods to control the engine to continue running at optimum auto-ignition timing in that mode, for example using data generated during combustion in a closed-loop ignition timing feedback control system. Such feedback method relies on data processing after combustion has occurred, to arrive at an ignition response parameter that has already happened, but could only be used to produce an error signal for influencing the response of the following cycle. Such method will not be of use for initiating the important first switched cycle to CAI/HCCI since no prior data is available.

In contrast, the auto-ignition timing control method of the present invention relies on high speed calculation prior to the combustion to arrive iteratively at an ignition conditioning parameter, namely, a target temperature occurring at a target reference timing, that will produce the desired auto-ignition timing for each stand-alone cycle before ignition actually happens. Such predictive approach is an improved method that can produce the correct auto-ignition timing to initiate the very first switched cycle to CAI/HCCI under any engine operating condition prevailing at the time of switching, and continue with the same control for each and every subsequent cycle without relying on any combustion feedback data being available.

Thus according to the preferred embodiment of the present invention, a first prediction will indicate how far the established equilibrium condition is away from the optimum auto-ignition timing position, a second prediction with a different set of engine operating parameter values will indicate how much change is necessary to move directly to a new equilibrium position with optimum auto-ignition timing, thus arriving at the correct engine setting and precise control in two modelling iteration steps. For example, the engine valve timing may be used to trap residual gases putting the engine into auto-ignition mode, and further used to adjust the effective compression ratio of the engine to position the auto-ignition precisely at the optimum timing.

In the preferred embodiment, the variable compression ratio may be determined globally or individually for each cylinder of a multi-cylinder engine, the latter offering the advantage of cylinder balancing for auto-ignition timing, using different compression ratios between cylinders to compensate for non-uniformities of other engine operating parameters across the engine, in particular, air charge temperature and coolant temperature both of which have strong influence on the compression temperature trajectory and auto-ignition timing.

Preferably, the engine is designed with a high compression sufficient to enable CAI/HCCI at low speed and load conditions, and the compression ratio is progressively reduced at higher speed and load conditions.

Therefore in summary, one preferred embodiment provides a method of controlling an internal combustion engine when operating in a controlled auto-ignition mode, the method depicted generally as path A in FIG. 3, comprising the following steps: before the commencement of an engine compression phase, determining 300 a target crank angle from a predetermined data table 305 and from current engine operating conditions 303. The data table provides a plurality of auto-ignition timing crank angle data relating to a plurality of engine operating conditions such as engine speed and load. Determining 310 a plurality of engine operating parameters (e.g. by utilizing sensors 308 or other data), and iteratively performing the steps of:

(i) utilizing the plurality of engine operating parameters, computing in 315 a predicted compression temperature which would be reached by the combustible charge at the target crank angle during the compression phase of the engine cycle;

(ii) comparing 320 the predicted compression temperature with a target temperature;

(iii) modifying 325 a computational value of at least one settable engine operating parameter;

(iv) returning to step (i) until a combination of parameters is found which would result in the predicted compression temperature matching the target temperature at the target crank angle.

Once a combination of parameters to match the target temperature at the target crank angle is found, setting 330 at least one of the actual settable engine operating parameters for the engine cycle in accordance with the final values ascertained by the iterative calculation process.

In another aspect of the present invention, there is provided a method of controlling an internal combustion engine when operating in a controlled auto-ignition mode, the method depicted generally as path B in FIG. 3, comprising the following steps: before the commencement of an engine compression phase determining 300 a target crank angle from a predetermined data table in 305 and from current engine operating conditions in 303. The data table providing a plurality of auto-ignition timing crank angle data relating to a plurality of engine operating conditions, such as engine speed and load. Determining in 310 a plurality of engine operating parameters, (e.g. by utilizing sensors 308 or other data), and iteratively performing the steps of (i) utilizing the plurality of engine operating parameters, computing 335 the crank angle during the compression phase of the engine cycle at which a target compression temperature would be reached by the combustible charge;

(ii) comparing 340 the predicted crank angle with the target crank angle;

(iii) modifying 345 the computational value of at least one of the settable engine operating parameters;

(iv) returning to step (i), until a combination of parameters is found which would result in the target compression temperature being reached at a predicted crank angle matching the target crank angle.

Once a combination of parameters to match the target crank angle is found, setting 330 at least one of the actual settable engine operating parameters for the engine cycle in accordance with the final values ascertained by the iterative calculation process.

In yet another aspect of the invention, there is provided a method of controlling a spark ignition internal combustion engine having variable compression ratio, the method depicted generally in FIG. 4, and comprising the following steps: Determining 405 a plurality of engine operating parameters, (e.g. by utilizing sensors 403 or other data), and iteratively performing the steps of:

(i) utilizing the plurality of engine operating parameters, computing 400 a predicted compression temperature which would be reached by the combustible charge at a predetermined target crank angle during the compression phase of the engine; (ii) comparing 420 the predicted compression temperature with a threshold temperature, the threshold temperature being lower than the auto-ignition temperature of the charge;

(iii) modifying 430 the computational value of at least one of the operating parameters;

(iv) returning to step (i), until a combination of parameters is found which would result in the predicted compression temperature not exceeding the threshold temperature.

Once a combination of parameters to match that target compression temperature is found, setting 440 at least one of the actual engine operating parameters for the engine cycle in accordance with the final values ascertained by the iterative calculation process such as to prevent premature charge ignition or engine knock. It is noted that the actual engine operating parameter may be set to any level that will cause a predicted compression temperature lower than threshold temperature.

BRIEF DESCRIPTION OF THE DRAWING

The invention will now be described further, by way of example, with reference to the accompanying drawings in which.

DETAILED DESCRIPTION OF THE PREFERRED EMBODIMENT

Figure 1:
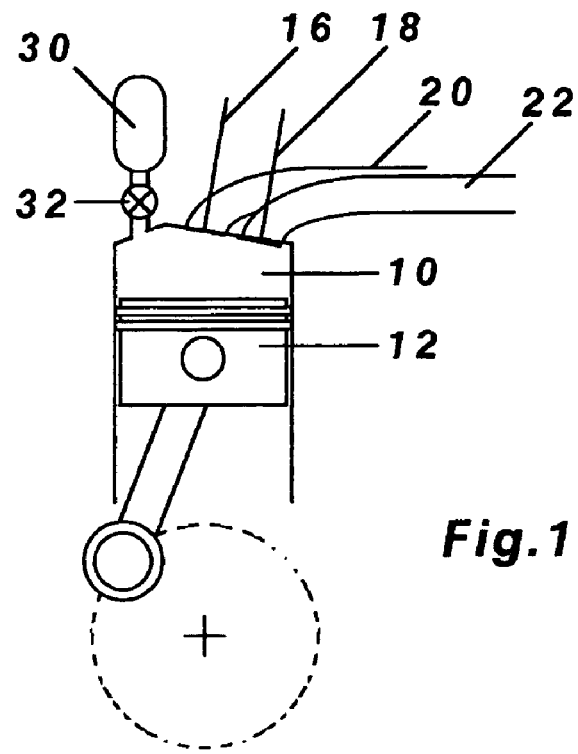
FIG. 1 shows a schematic view of a variable compression ratio internal combustion engine having an auxiliary chamber connected by a shut-off valve to the engine cylinder.

FIG. 1 shows a schematic view of a cylinder 10 of a reciprocating internal combustion four-stroke cycle engine with a piston 12 reciprocating in the cylinder 10. Exhaust and intake valves 16, 18 connecting the cylinder 10 with exhaust and intake ports 20, 22 are shown in their closed positions during the compression and expansion strokes of the piston 12. The engine also includes a fuel system and an ignition system which are not shown in FIG. 1.

An auxiliary chamber 30 is connected by a shut-off valve 32 to the engine cylinder 10. The shut-off valve 32 is switched open and shut by an electro-magnetic, electro-hydraulic or electro-pneumatic actuator (not shown), connecting and disconnecting the auxiliary chamber 30 with the engine cylinder 10 at the various switching timings during the compression period of the engine, thus varying the effective compression ratio of the engine.

When the auxiliary chamber 30 is connected to the cylinder 10, its volume in conjunction with the basic design of the engine determines the lower limit compression ratio of the engine. On the other hand, when the auxiliary chamber 30 is disconnected from the cylinder 10, the upper limit compression ratio of the engine is determined entirely by the basic design of the engine and is independent of the volume of the auxiliary chamber 30. As an example, the engine may be designed with an upper limit compression ratio of 18:1 excluding the auxiliary chamber 30, and a lower limit compression ratio of 9:1 including the auxiliary chamber 30.

In FIG. 1, the crank angle timing of connecting the auxiliary chamber 30 to the engine cylinder 10 marking the beginning of the low compression stage is variable and controlled to occur after the end of the intake period of the engine cycle. Also, the crank angle timing of disconnecting the auxiliary chamber 30 from the engine cylinder 10 marking the beginning of the high compression stage is variable and controlled to occur before the start of the combustion period of the engine cycle. This ensures that the auxiliary chamber 30 does not form part of the combustion chamber during the combustion period. The fuel/air mixture trapped inside the auxiliary chamber will be released and re-admitted during the compression period of the subsequent engine cycle and this will not affect the volumetric efficiency of that cycle or the final air charge in the cycle available for combustion.

Figure 2:
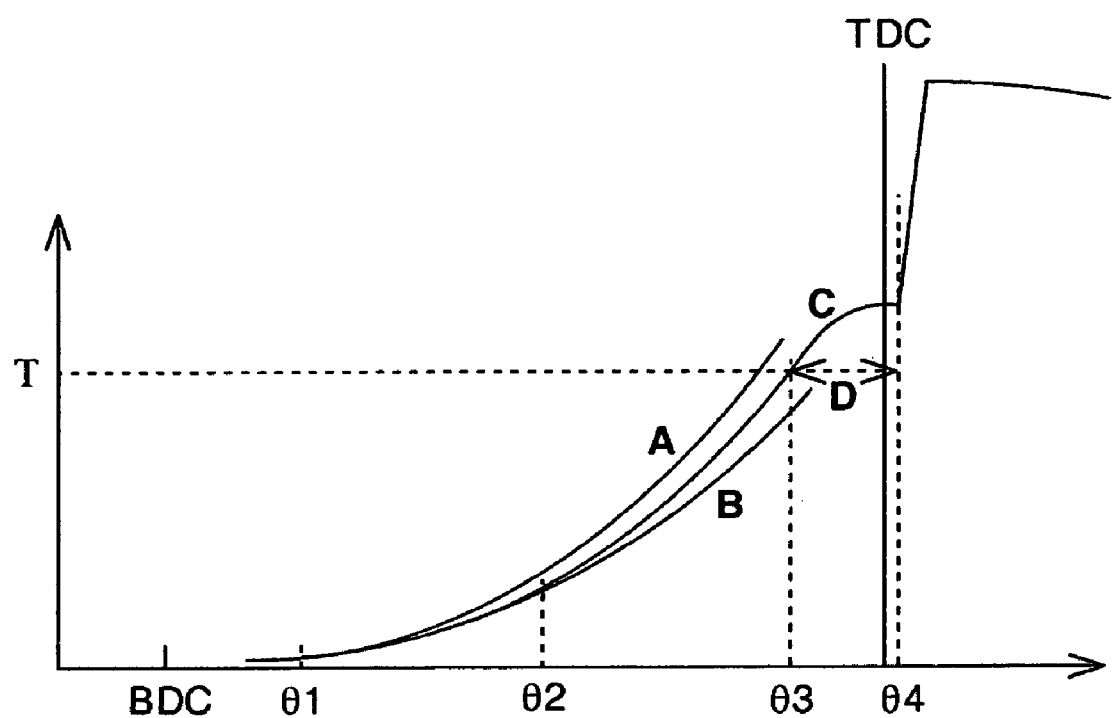
FIG. 2 shows the compression temperature trajectories of the cylinder charge with time used for auto-ignition timing control according to the method of the present invention.
Figure 3:
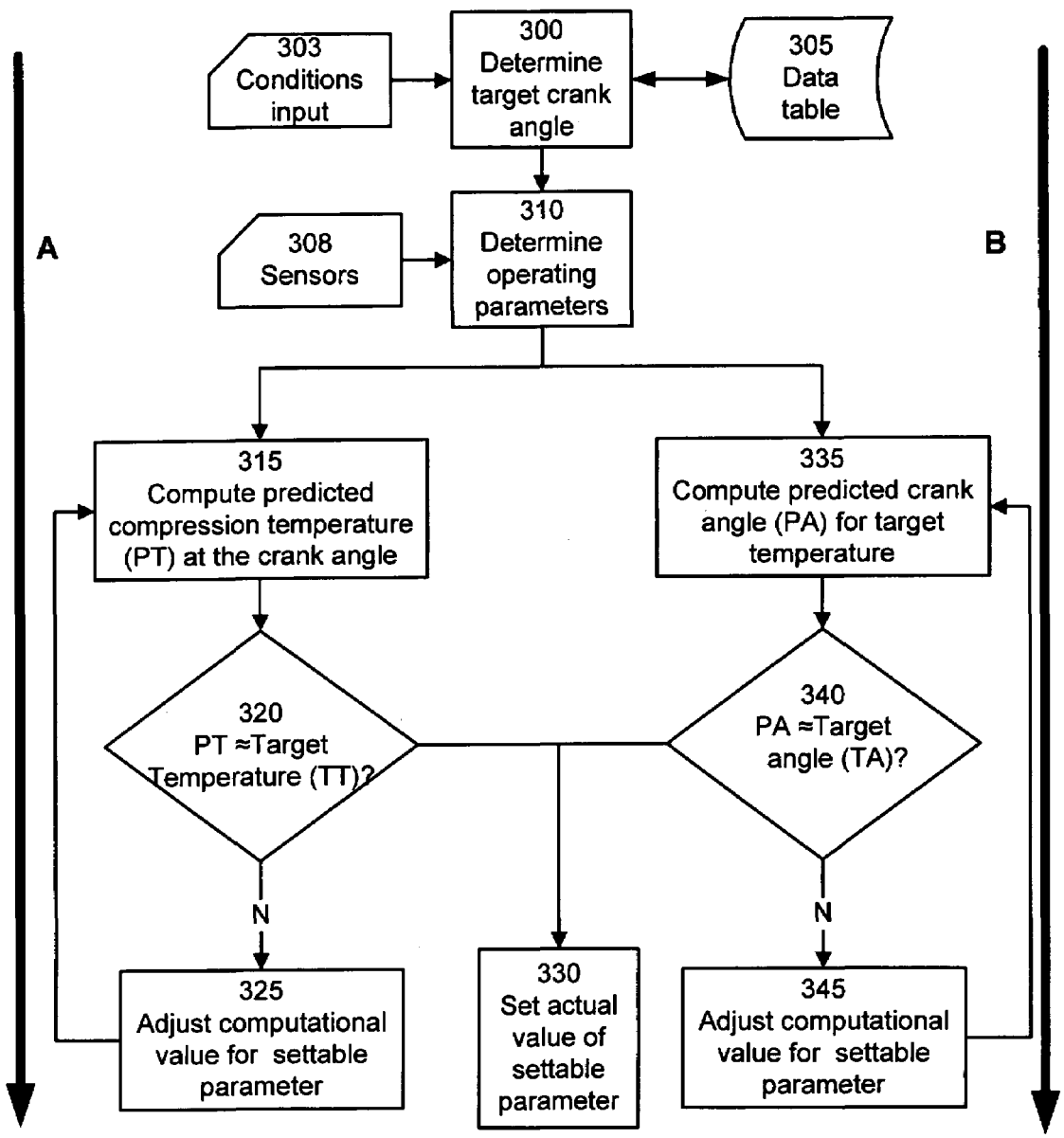
FIG. 3 depicts a simplified flow diagram of compression temperature based, and crank angle based, embodiments of the invention.
Figure 4:
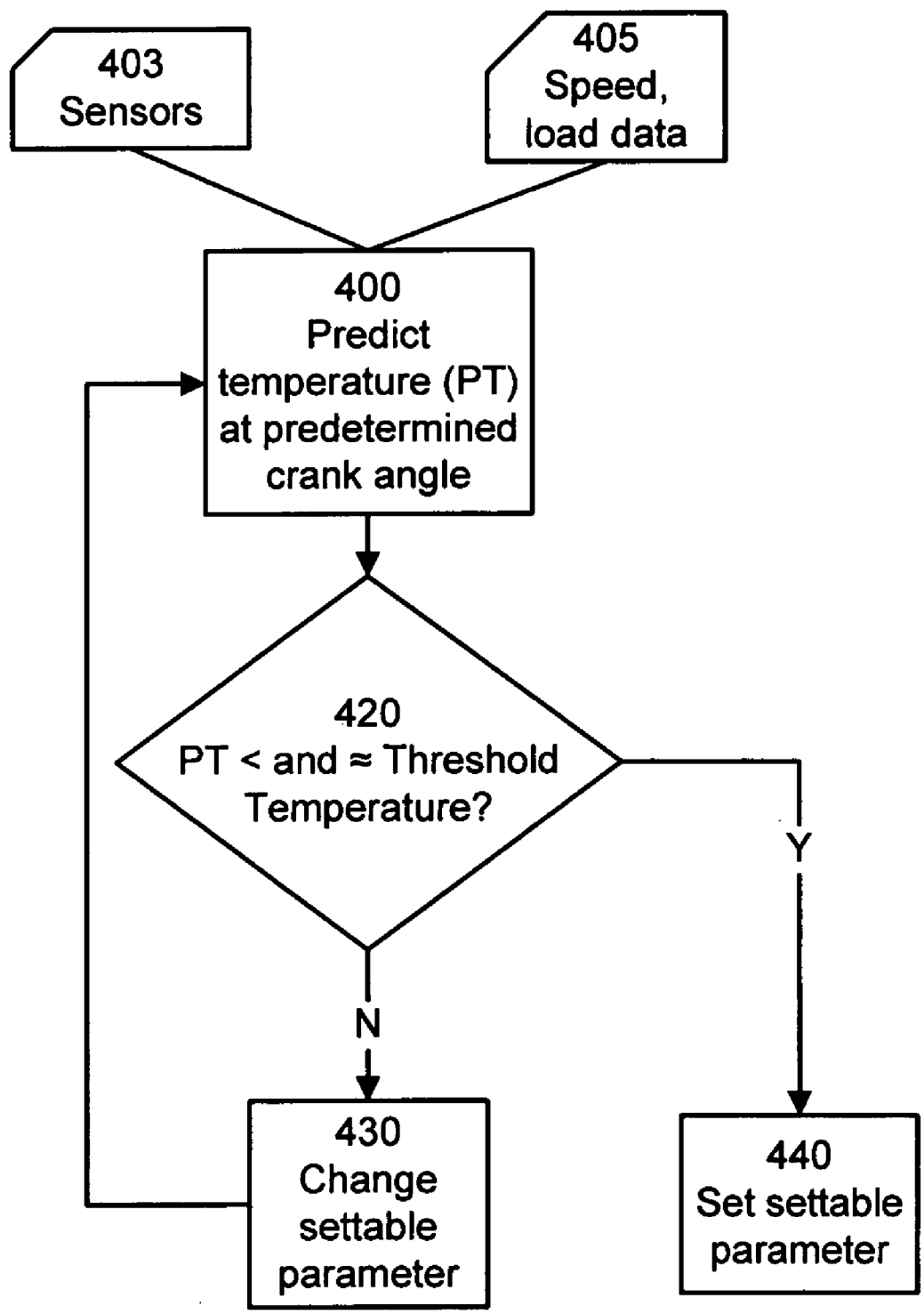
FIG. 4 depicts a simplified flow diagram showing the use of the present invention to prevent engine knock.

FIG. 2 shows the temperature curves of the cylinder charge undergoing compression plotted against crank angle during the compression stroke of the piston between BDC (Bottom Dead Center) and TDC (Top Dead Center) of the engine for different switching timings of the shut-off valve 32. Curve A represents the upper limit compression temperature when the auxiliary chamber 30 is permanently disconnected from the engine cylinder 10 during the entire compression period, or is connected at the start of the curve and immediately disconnected for the rest of the curve for the shortest connecting period. Curve B represents the lower limit compression temperature when the auxiliary chamber 30 is permanently connected to the engine cylinder 10 during the entire compression period, or is connected at the start of the curve and remains connected until it is disconnected at the end of the curve for the longest connecting period. Curve C represents the cylinder charge temperature produced by two compression stages comprising a low compression stage during which the auxiliary chamber 30 is connected to the engine cylinder 10 for an intermediate connecting period between θ1 and θ2 followed by a high compression stage during which the auxiliary chamber 30 is disconnected from the engine cylinder 10 starting from θ2. Depending on the respective crank angle timings θ1, θ2 of connecting and disconnecting the auxiliary chamber 30, it is clear that Curve C may be manipulated to produce a temperature trajectory lying anywhere between the upper limit Curve A and the lower limit Curve B, along which the cylinder charge is compressed to an intermediate temperature during the low compression stage, and further compressed to a final temperature during the high compression stage.

In FIG. 2, a target temperature T is shown intersected by the temperature trajectory of Curve C at an intersection timing θ3 relative to the engine cycle. This target temperature T may be the auto-ignition temperature of the fuel/air mixture defined either by theory or by experiment. The position of the intersection timing θ3 is used in the present specifications as the target reference timing for calibrating the pending auto-ignition timing of the fuel/air mixture in the engine.

According to the present invention, a delay duration D between a first timing when the cylinder charge is calculated to reach the target temperature T and a second timing when the cylinder charge shows rapid heat release by auto-ignition is predetermined by calibration and used to define the target reference timing θ3 by subtracting back from a target auto-ignition timing θ4. This delay duration D will be calibrated in dependence on the composition of the cylinder charge and the operating speed and load of the engine.

In calculating the compression temperature trajectory of the cylinder charge with time, the initial and boundary conditions of the cylinder charge and the interim heat exchange processes preferably include engine speed and load, fuel composition, fuel/air mixture ratio, fuel injection and evaporation, intake charge quantity and temperature, coolant temperature, EGR quantity and temperature, residual charge quantity and temperature, each measured or inferred using appropriate sensors. This will be based on computer modelling of the thermodynamic processes influencing the compression temperature of the cylinder charge during the compression stroke for the engine and take into account the interactions of the all the above parameters according to the laws of physics, thus capturing the effect of all the parameters in a unified manner in a single compression temperature trajectory that could be defined with just a few characteristic features (T and θ3), and these can be readily adapted for calibration for a high level control map explicitly for auto-ignition timing θ4. In this way, the traditional method of treating the parameters separately in a myriad of multi-layer multi-dimensional calibration maps is bypassed, thus reducing the calibration effort to a manageable level.

In applying the auto-ignition timing control method to achieve a target reference timing θ3 for CAI/HCCI, the required effective compression ratio setting is determined iteratively by calculating a range of temperature trajectories of Curve C which intersect with the target reference temperature T at a range of intersection timings, and selecting the trajectory intersecting nearest to the target reference timing θ3.

There are various ways of determining the required compression ratio iteratively. In one method, a series of temperature trajectories each associated with a series of compression ratio values may be calculated sequentially, gradually homing in on to the target compression ratio value. In another method, two or more sets of temperature trajectories may be calculated simultaneously, arriving at the target compression ratio by interpolation or extrapolation. Both methods could be completed at high speed within a very short lead time, ideally before the compression stroke in time to determine the compression ratio of the stroke, permitting cycle-by-cycle control of the compression ratio in real time.

Thus in order to achieve a target auto-ignition timing θ4 (for example 2° ATDC) when the engine is operated in the CAI/HCCI mode, the calculated temperature trajectory of Curve C is manipulated by varying the compression ratio value iteratively such that a target reference temperature T (for example 1000° K.) is reached at an intersection reference crank angle timing θ3 (for example 10° BTDC) for the mixture to auto-ignite at the desired timing θ4 after a delay duration D (for example 12° crank angle) relative to the reference timing θ3. In this way, a precise command setting of the compression ratio is defined that would directly trigger a predictable and precise auto-ignition timing under any engine operating condition according to a predetermined auto-ignition timing map.

In FIG. 1 using the high and low compression ratio values of 18:1 and 9:1 respectively selected in the example, the engine may be a gasoline spark ignition engine also capable of operating in the controlled auto-ignition mode. The same engine may also be a diesel compression ignition engine also capable of operating in the homogeneous charge compression ignition mode.

It would be clear that the above method is applicable globally or individually for each cylinder of a multi-cylinder engine, the latter offering the advantage of cylinder balancing for auto-ignition timing, using different compression ratios between cylinders to compensate for non-uniformities of other engine operating parameters across the engine, in particular, air charge temperature and coolant temperature both of which have strong influence on the compression temperature trajectory and auto-ignition timing.

In summary, the preferred method of controlling an internal combustion engine operating in a controlled auto-ignition mode comprises according to a first approach:
  determining a plurality of engine operating parameters before the commencement of an engine cycle;
  iteratively performing the steps of
    (i) predicting by means of a mathematical algorithm the compression temperature which would be reached by the combustible charge at a target crank angle during the compression phase of the engine cycle,
    (ii) comparing the predicted temperature with a target temperature, and
    (iii) modifying the value(s) of at least a selected one of the said operating parameters and returning to step (i),
  until a combination of parameters is found which would result in the predicted compression temperature matching the target temperature at the target crank angle; and
  setting the actual engine operating parameters for the said engine cycle in accordance with the final values ascertained by the said iterative calculation process.

Alternatively, the method comprises according to a second approach:
  determining a plurality of engine operating parameters before the commencement of an engine cycle;
  iteratively performing the steps of
    (i) predicting by means of a mathematical algorithm the crank angle during the compression phase of the engine cycle at which a target compression temperature would be reached by the combustible charge, (ii) comparing the predicted crank angle with a target crank angle, and (iii) modifying the value(s) of at least a selected one of the said operating parameters and returning to step (i), until a combination of parameters is found which would result in the target compression temperature being reached at a predicted crank angle matching the target crank angle; and setting the actual engine operating parameters for the said engine cycle in accordance with the final values ascertained by the said iterative calculation process.

In both the above cases, the target values of charge temperature and crank angle are predetermined by calibration for any given engine speed and load condition, and retrievable from the resulting calibration map or look-up table at the same engine speed and load condition.

Finally, in the case of a spark ignition engine, there is risk of adverse effect such as uncontrolled auto-ignition or knock because of high compression ratio when the engine is switched to the spark ignition mode. In order to avoid this, the calculated temperature trajectory of Curve C may be manipulated according to another schedule by varying effective compression ratio iteratively in such a way that a compression temperature not exceeding a predetermined threshold temperature is reached at another predetermined reference crank angle timing relative to the spark timing for the mixture to be spark-ignited and burn smoothly across the combustion chamber without causing knock in the end-gas region. This is a corollary invention for controlling another aspect of auto-ignition, i.e., not to allow any uncontrolled auto-ignition.

Thus in order to achieve the above non-knocking compression temperature at the above reference timing, the required compression ratio of the engine is determined iteratively by calculating a range of trajectories of the compression temperature which intersect with the said reference timing at a range of intersection temperatures, and selecting the trajectory intersecting nearest but not exceeding the said threshold temperature. Such control method may be applied globally or individually for each cylinder of a multi-cylinder engine, the latter offering the advantage of adaptive knock control, using different compression ratios between cylinders to compensate for non-uniformities of other engine operating parameters across the engine, and not relying on knock sensors or feedback control.

In the case of the compression ignition engine, there is no risk of adverse effect when the engine is switched to the conventional compression ignition mode using high compression ratio with the auxiliary chamber 30 permanently disconnected from the engine cylinder 10.

In the above description, an auxiliary chamber 30 has been used as an example for varying the effective compression ratio of the engine. Other means of varying the compression ratio may alternatively be used including varying the engine mechanical geometry affecting the bump clearance of the piston relative to the cylinder head of the engine, and varying the intake valve closing timing affecting the start of compression along the compression stroke of the engine.

While here has been described what is now believed to be the best mode of implementing the invention, it will be clear that the above details were provided merely by way of example and that the skilled in the art will find numerous modifications and variations, that in light of the principles and teachings of the present invention, to implement the many technical choices of exercising the invention. Such modifications and variations are to be considered equivalents to the specific examples provided herein and the invention and the claims extend thereto.

What is claimed is:

1. A method of controlling an internal combustion engine when operating in a controlled auto-ignition mode, the method comprising the steps of:

before the commencement of an engine compression phase determining a target crank angle from a predetermined data table and from current engine operating conditions, the data table providing a plurality of auto-ignition timing crank angle data relating to a plurality of engine operating conditions;

determining a plurality of engine operating parameters;

iteratively performing the steps of (i) utilizing the plurality of engine operating parameters, computing a predicted compression temperature which would be reached by the combustible charge at the target crank angle during the compression phase of the engine cycle;

(ii) comparing the predicted compression temperature with a target temperature;

(iii) modifying a computational value of at least one settable engine operating parameter;

(iv) returning to step (i) until a combination of parameters is found which would result in the predicted compression temperature matching the target temperature at the target crank angle; and setting at least one of the actual engine operating parameters for the engine cycle in accordance with the final values ascertained by the iterative calculation process.

2. A method of controlling an internal combustion engine as claimed in claim 1, wherein the engine operating conditions are engine speed and load.

3. A method of controlling an internal combustion engine as claimed in claim 1, wherein the target temperature equals or approximates the auto-ignition temperature of the fuel used.

4. A method of controlling an internal combustion engine as claimed in claim 1, wherein the step of computing comprises considering the cooling effects on the charge caused by injection of fuel and the boundary conditions at the walls of the combustion chamber.

5. A method of controlling an internal combustion engine as claimed in claim 1, wherein the target crank angle for the target temperature equals or approximates the target auto-ignition crank angle adjusted for ignition delay.

6. A method of controlling an internal combustion engine as claimed in claim 1, wherein the at least one settable operating parameter is the effective compression ratio of the engine.

7. A method of controlling an internal combustion engine as claimed in claim 1, wherein the step of computing comprises the step of calculating the compression temperature trajectory of the cylinder charge, in relation to time or crank angle.

8. A method of controlling an internal combustion engine as claimed in claim 7, wherein the trajectory is calculated in dependence on initial and boundary conditions of the charge subjected to the settable engine operating parameter.

9. A method of controlling an internal combustion engine as claimed in claim 7, wherein the trajectory is further calculated in dependence on an interim heat exchange processes affecting the charge.

10. A method of controlling an internal combustion engine as claimed in claim 1, wherein the table comprises data regarding a desired target timing (θ4) at which auto-ignition initiates, and an associated delay duration from the target crank angle (θ3) at which the target temperature is reached to the target auto-ignition timing (θ4) at which the cylinder charge begins to show rapid heat release as a result of auto-ignition.

11. A method of controlling an internal combustion engine as claimed in claim 10, wherein the engine comprises a sensor for measuring the start of combustion for validating and if necessary adjusting the calibrated value of the said delay duration, thereby adaptively improving the control accuracy of the auto-ignition timing in future engine cycles.

12. A method of controlling an internal combustion engine as claimed in claim 1, wherein said method is applied separately for each cylinder of a multi-cylinder engine.

13. A method of controlling an internal combustion engine as claimed in claim 1, wherein the engine operating parameters are selected from a list consisting of: engine effective compression ratio, fuel composition, fuel/air mixture ratio, fuel injection and evaporation, intake charge quantity and temperature, coolant temperature, EGR quantity and temperature, residual charge quantity and temperature, and a combination thereof.

14. A method of controlling an internal combustion engine as claimed in claim 1, wherein the settable parameters are selected from a list consisting of: intake charge quantity, fuel/air mixture, fuel injection timing, amount of fuel injected, EGR quantity, residual charge, and a combination thereof.

15. A method of controlling an internal combustion engine as claimed in claim 1, further comprising the steps of:
Performing the iterative steps at least twice, obtaining a first and compression temperature test values; and,
Interpolating or extrapolating the at least one settable engine parameter utilizing the first and second compression temperature test values to obtain a setting for the settable engine parameters which will result in closer proximity to the target compression temperature.

16. A method of controlling an internal combustion engine when operating in a controlled auto-ignition mode, the method comprising the steps of:
before the commencement of an engine compression phase determining a target crank angle from a predetermined data table and from current engine operating conditions, the data table providing a plurality of auto-ignition timing crank angle data relating to a plurality of engine operating conditions;
determining a plurality of engine operating parameters;
iteratively performing the steps of
(i) utilizing the plurality of engine operating parameters, computing the crank angle during the compression phase of the engine cycle at which a target compression temperature would be reached by the combustible charge;
(ii) comparing the predicted crank angle with the target crank angle;
(iii) modifying the computational value of at least one of the settable engine operating parameters;
(iv) returning to step (i), until a combination of parameters is found which would result in the target compression temperature being reached at a predicted crank angle matching the target crank angle; and setting at least one of the actual engine operating parameters for the engine cycle in accordance with the final values ascertained by the iterative calculation process.

17. A method of controlling an internal combustion engine as claimed in claim 16, wherein the engine operating conditions are engine speed and load.

18. A method of controlling an internal combustion engine as claimed in claim 16, wherein the target temperature equals or approximates the auto-ignition temperature of the fuel used.

19. A method of controlling an internal combustion engine as claimed in claim 16, wherein the step of computing comprises considering the cooling effects on the charge by injection of fuel and the boundary conditions at the walls of the combustion chamber.

20. A method of controlling an internal combustion engine as claimed in claim 16, wherein the target crank angle for the target temperature equals or approximates the target auto-ignition crank angle adjusted for ignition delay.

21. A method of controlling an internal combustion engine as claimed in claim 16, wherein the at least one settable operating parameter is the effective compression ratio of the engine.

22. A method of controlling an internal combustion engine as claimed in claim 16, wherein the step of computing comprises the step of calculating the compression temperature trajectory of the cylinder charge, in relation to time or crank angle.

23. A method of controlling an internal combustion engine as claimed in claim 22, wherein the trajectory is calculated in dependence on initial and boundary conditions of the charge subjected to the settable engine operating parameter.

24. A method of controlling an internal combustion engine as claimed in claim 23, wherein the trajectory is further calculated in dependence on an interim heat exchange processes affecting the charge.

25. A method of controlling an internal combustion engine as claimed in claim 16, wherein the table comprises data regarding a desired target timing (θ4) at which auto-ignition initiates, and an associated delay duration from the target crank angle (θ3) at which the target temperature is reached to the target auto-ignition timing (θ4) at which the cylinder charge begins to show rapid heat release as a result of auto-ignition.

26. A method of controlling an internal combustion engine as claimed in claim 25, wherein the engine comprises a sensor for measuring the start of combustion for validating and if necessary adjusting the calibrated value of the said delay duration, thereby adaptively improving the control accuracy of the auto-ignition timing in future engine cycles.

27. A method of controlling an internal combustion engine as claimed in claim 16, wherein said method is performed separately for each cylinder of a multi-cylinder engine.

28. A method of controlling an internal combustion engine as claimed in claim 16, wherein the engine operating parameters are selected from a list consisting of: engine effective compression ratio, fuel composition, fuel/air mixture ratio, fuel injection and evaporation, intake charge quantity and temperature, coolant temperature, EGR quantity and temperature, residual charge quantity and temperature, and a combination thereof.

29. A method of controlling an internal combustion engine as claimed in claim 16, wherein the settable parameters are selected from a list consisting of: intake charge quantity, fuel/air mixture, fuel injection timing, amount of fuel injected, EGR quantity, residual charge, and a combination thereof.

30. A method of controlling an internal combustion engine as claimed in claim 16, further comprising the steps of:
Performing the iterative steps at least twice, obtaining a first and second crank angle test values; and,
Interpolating or extrapolating the at least one settable engine parameter utilizing the first and second crank angle test values to obtain a setting for the settable engine parameters which will result in closer proximity to the target crank angle.

31. A method of controlling a spark ignition internal combustion engine having variable compression ratio, the method comprising the steps of:
determining a plurality of engine operating parameters;
iteratively performing the steps of
(i) utilizing the plurality of engine operating parameters, computing a predicted compression temperature which would be reached by the combustible charge at a target crank angle during the compression phase of the engine;
(ii) comparing the predicted compression temperature with a threshold temperature, the threshold temperature being lower than the auto-ignition temperature of the charge;
(iii) modifying the value of at least one of the operating parameters;
(iv) returning to step (i), until a combination of parameters is found which would result in the predicted compression temperature not exceeding the threshold temperature; and,
setting at least one of the actual engine operating parameters for the engine cycle in accordance with the final values ascertained by the iterative calculation process such as to prevent engine knock.

32. A method of controlling a spark ignition internal combustion engine as claimed in claim 31, wherein the settable parameter is the effective compression ratio of the engine.

33. A method of controlling a spark ignition internal combustion engine as claimed in claim 31, wherein the engine operating parameters are selected from a list consisting of: engine effective compression ratio, fuel composition, fuel/air mixture ratio, fuel injection and evaporation, intake charge quantity and temperature, coolant temperature, EGR quantity and temperature, residual charge quantity and temperature, and a combination thereof.

* * * * *